(12) United States Patent
Lakshmanamurthy et al.

(10) Patent No.: US 7,103,821 B2
(45) Date of Patent: Sep. 5, 2006

(54) METHOD AND APPARATUS FOR IMPROVING NETWORK ROUTER LINE RATE PERFORMANCE BY AN IMPROVED SYSTEM FOR ERROR CHECKING

(75) Inventors: Sridhar Lakshmanamurthy, Sunnyvale, CA (US); Charles E. Narad, Los Altos, CA (US); Lawrence B. Huston, Wexford, PA (US); Yim Pun, Saratoga, CA (US); Kin-Yip Liu, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 832 days.

(21) Appl. No.: 10/188,516

(22) Filed: Jul. 3, 2002

(65) Prior Publication Data

US 2004/0006725 A1    Jan. 8, 2004

(51) Int. Cl.
*H03M 13/00*    (2006.01)

(52) U.S. Cl. .................................................. 714/758
(58) Field of Classification Search ................ 714/763, 714/758
See application file for complete search history.

(56) References Cited

U.S. PATENT DOCUMENTS

| | | | | |
|---|---|---|---|---|
| 6,058,047 | A | * | 5/2000 | Kikuchi ................. 365/185.33 |
| 6,076,182 | A | * | 6/2000 | Jeddeloh ..................... 714/763 |
| 6,701,471 | B1 | * | 3/2004 | Tamura et al. .............. 714/718 |

\* cited by examiner

*Primary Examiner*—Shelly Chase
(74) *Attorney, Agent, or Firm*—Grossman, Tucker, Perreault & Pfleger, PLLC

(57) ABSTRACT

A method and apparatus for improving network router line rate performance by an improved system for error correction is described. In an embodiment of the present invention, error correction is performed by a hardware-based system within the processing engine of a router's network processor.

28 Claims, 8 Drawing Sheets

METHOD AND APPARATUS FOR IMPROVING NETWORK ROUTER LINE RATE PERFORMANCE BY AN IMPROVED SYSTEM FOR ERROR CHECKING

BACKGROUND INFORMATION

The present invention relates to network processors. More specifically, the present invention relates to a system for providing improved network data flow rates, while providing error checking at individual network routers.

FIG. 1 provides a typical configuration of a computer network. In this example, a plurality of computer systems 102 are connected to and are able to communicate with each other, as well as the Internet 104. The computer systems are linked to each other and, in this example, the Internet by a device such as a router 106. The computer systems 102 communicate with each other using any of various communication protocols, such as Ethernet, IEEE 802.3 (Institute of Electrical and Electronics Engineers 802.3 Working Group, 2002), token ring, and Asynchronous Transfer Mode (ATM; Multiprotocol Over ATM, Version 1.0, Jul. 1998). Routers 106, among other things, insure sets of data go to their correct destinations. Routers 106 utilize network processors (not shown), which perform various functions in the transmission of network data, including data encryption, error detection, and the like.

As flow rates improve for network devices, it is necessary to eliminate bottlenecks adversely affecting overall network flow. Data error checking is calculation-intensive and thus, can greatly affect a router's performance with regard to flow rate. It is therefore desirable to have an improved system for network processor error checking that increases a router's potential bandwidth.

DETAILED DESCRIPTION

Figure 1:
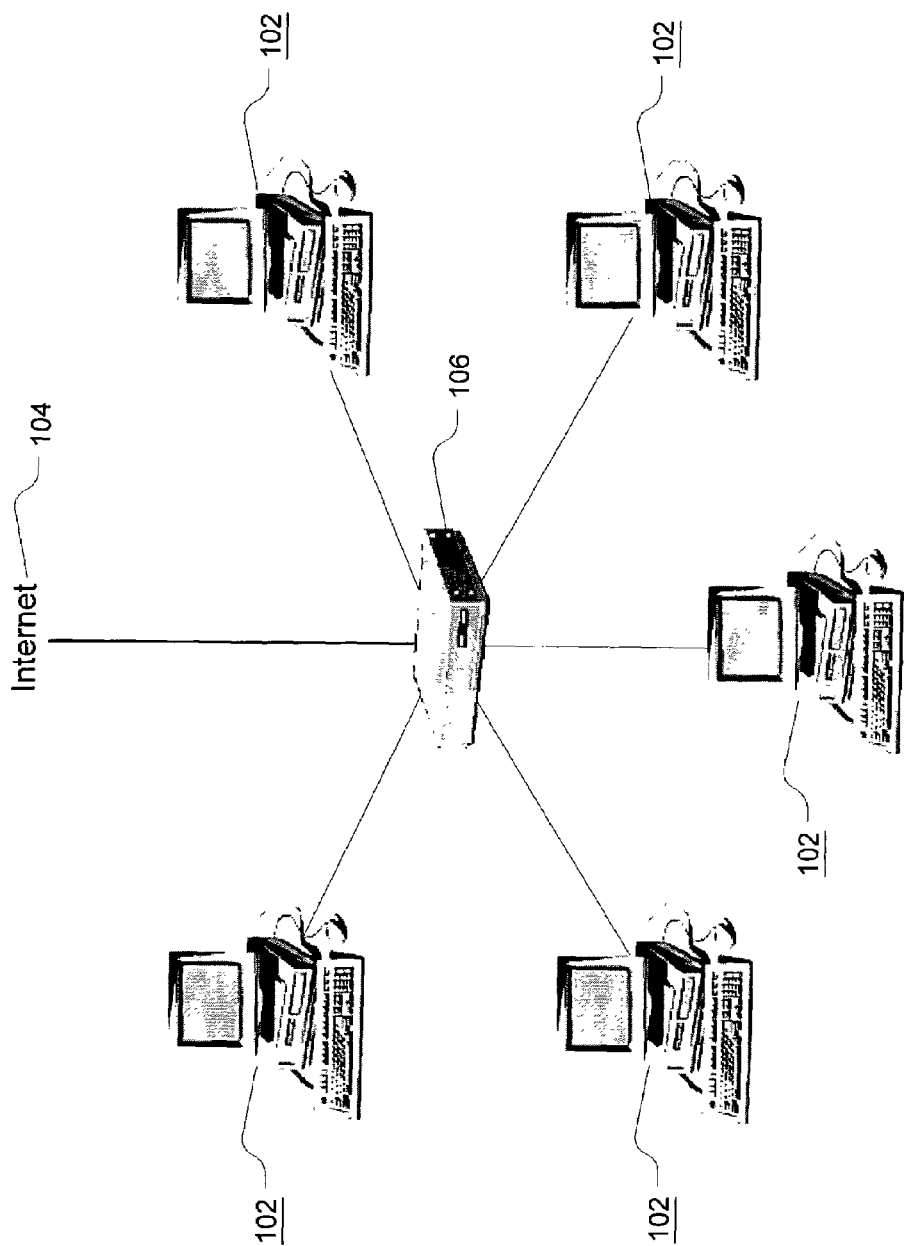
FIG. 1 illustrates a typical configuration of a computer network.
Figure 2:
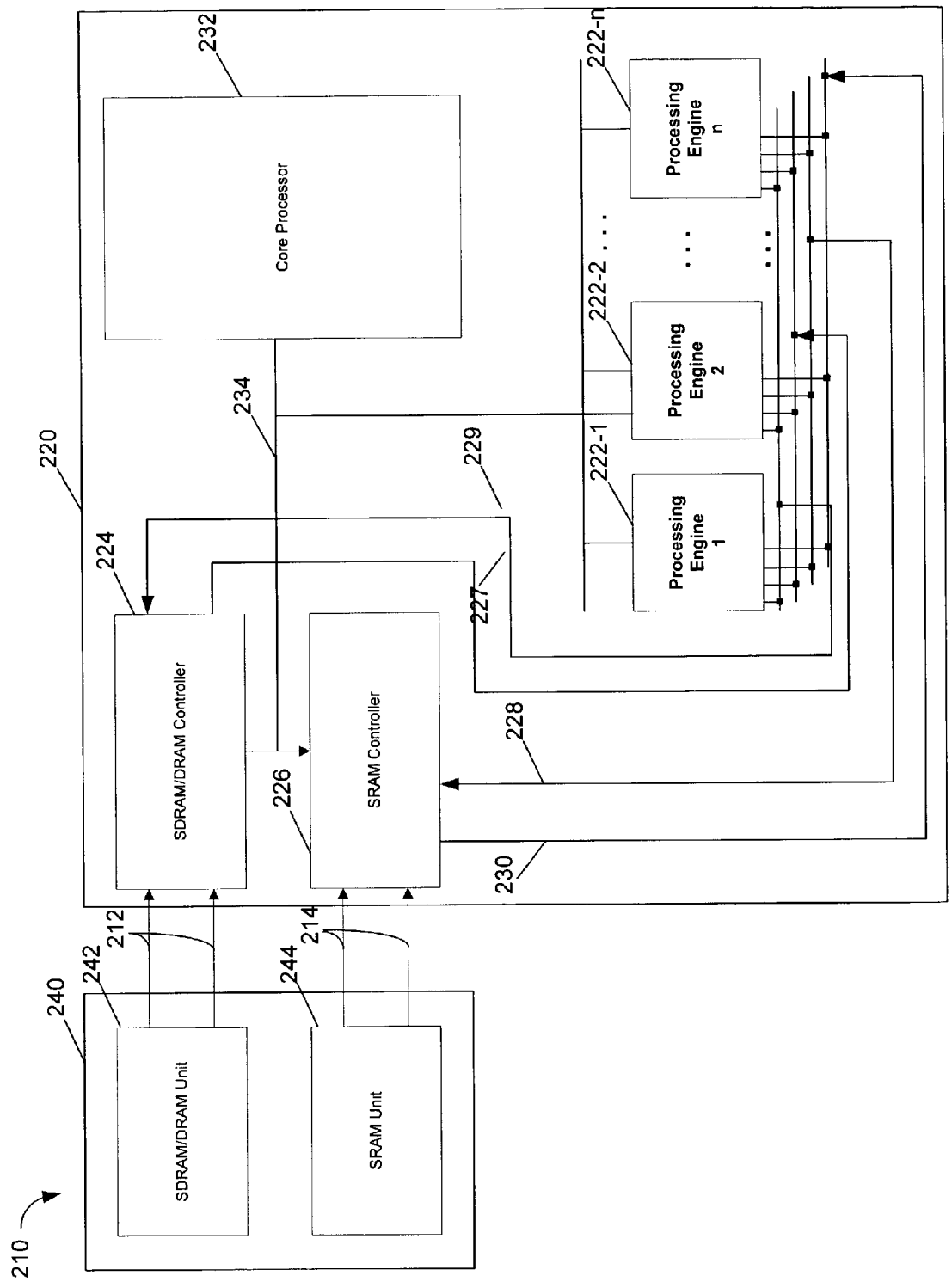
FIG. 2 provides a block diagram of a processing system according to an embodiment of the present invention.

A method and apparatus for improving network router performance by an improved system for error checking is described. FIG. 2 provides a block diagram of a processing system according to an embodiment of the present invention. In one embodiment, a processor system 210 includes a parallel, hardware-based multithreaded network processor 220, coupled by a pair of memory buses 212, 214 to a memory system or memory resource 240. The memory system 240 includes a dynamic random access memory (DRAM) unit 242 and a static random access memory (SRAM) unit 244. In an embodiment, the processor system 210 is useful for tasks that can be broken into parallel subtasks or functions. The hardware-based multithreaded processor 220 may have multiple processing engines (microengines) 222-1–222-n, each with multiple hardware-controlled threads that may be simultaneously active.

In an embodiment, processing engines 222-1–222-n maintain program counters and their respective states in hardware. Effectively, corresponding sets of contexts or threads can be simultaneously active on each of processing engines 222-1–222-n while only one processing engine may be actually operating at a given time.

In one embodiment, eight processing engines 222-1–222-n, where n=8, are implemented, the processing engines 222-1–222-n having the ability for processing eight hardware threads or contexts. The eight processing engines 222-1–222-n operate with shared resources, including memory resource 240 and bus interfaces. In an embodiment, the hardware-based multithreaded processor 220 includes a dynamic random access memory (DRAM)/static DRAM (SDRAM/DRAM) controller 224 and a static random access memory (SRAM) controller 226. The SDRAM/DRAM unit 242 and SDRAM/DRAM controller 224 are used for processing large volumes of data, such as the processing of network payloads from network packets. The SRAM unit 244 and SRAM controller 226 are used in a networking implementation for low latency, fast access tasks, such as accessing look-up tables, core processor memory, and the like.

In accordance with an embodiment of the present invention, push buses 227, 228 and pull buses 229, 230 are used to transfer data between processing engines 222-1–222-n and SDRAM/DRAM unit 242 and SRAM unit 244. In particular, push buses 227, 228 may be unidirectional buses that move the data from memory resource 240 to processing engines 222-1–222-n whereas pull buses 229, 230 move data from processing engines 222-1–222-n to their associated SDRAM/DRAM unit 242 and SRAM unit 244 in memory resource 240.

In accordance with an embodiment of the present invention, eight processing engines 222-1–222-8 may access either SDRAM/DRAM unit 242 or SRAM unit 244 based on characteristics of the data. Thus, low latency, low bandwidth data may be stored in and fetched from SRAM unit 244, whereas higher bandwidth data for which latency is not as important, may be stored in and fetched from SDRAM/DRAM unit 242. Processing engines 222-1–222-n may execute memory reference instructions to either SDRAM/DRAM controller 224 or SRAM controller 226.

In accordance with an embodiment of the present invention, the hardware-based multithreaded processor 220 also may include a core processor 232 for loading micro-code control for other resources of the hardware-based multithreaded processor 220. In this example, core processor 232 may be a XScale™-based architecture manufactured by Intel Corporation of Santa Clara, Calif. Core processor 232 may be coupled by a processor bus 234 to DRAM unit 224 and SRAM unit 226.

In one embodiment, the core processor 232 performs general functions such as handling protocols, exceptions, and extra support for packet processing where processing engines 222-1–222-n may pass the packets off for more processing. The core processor 232 has an operating system (OS) (not shown). Through the OS, core processor 232 may call functions to operate on processing engines 222-1–222-n. Core processor 232 may use any supported OS, such as, a real time OS. In an embodiment of the present invention, core processor 232 may be implemented as an XScale™ architecture, using, for example, operating systems such as the Windows® NT real-time operating system from Microsoft Corporation of Redmond, Wash.; VXWorks® operating system from Wind River International of Alameda, Calif.; μC/OS operating system, from Micrium, Inc. of Weston, Fla., etc.

Advantages of hardware multithreading may be explained in relation to SRAM or SDRAM/DRAM accesses. As an example, an SRAM access requested by a context (that is, a thread, from one of processing engines 222-1–222-n may cause SRAM controller 226 to initiate an access to SRAM unit 244. SRAM controller 226 may access SRAM memory unit 226, fetch the data from SRAM unit 226, and return data to the requesting programming engine 222-1–222-n.

During an SRAM access, if one of the processing engines 222-1–222-n had only a single thread that could operate, that one processing engine would be dormant until data was returned from the SRAM unit 244.

By employing hardware context swapping within each of processing engines 222-1–222-n, the hardware context swapping may enable other contexts with unique program counters to execute in that same engine. Thus, a second thread may operate while the first awaits the read data to return. During execution, the second thread accesses SDRAM/DRAM unit 242. In an embodiment, while the second thread operates on SDRAM/DRAM unit 242, and the first thread operates on SRAM unit 244, a third thread, also operates in a third of processing engines 222-1–222-n. The third thread operates for a certain amount of time until it needs to access memory or perform some other long latency operation, such as making an access to a bus interface. Therefore, processor 220 may have simultaneously executing bus, SRAM and SDRAM/DRAM operations that are all being completed or operated upon by one of processing engines 222-1–222-n and have one more thread available to process work.

The hardware context swapping may also synchronize completion of tasks. For example, if two threads hit a shared memory resource, such as the SRAM memory unit 244, each one of the separate functional units, such as the SRAM controller 226 and SDRAM/DRAM controller 224, may report back a flag signaling completion of an operation upon completion of a requested task from one of the processing engine threads or contexts. Once the processing engine executing the requesting thread receives the flag, the processing engine determines which thread to turn on.

In an embodiment of the present invention, the hardware-based multithreaded processor 220 may be used as a network processor. As a network processor, hardware-based multithreaded processor 220 may interface to network devices such as a Media Access Control (MAC) device, such as a 10/100BaseT Octal MAC or a Gigabit Ethernet device (not shown) (Gigabit Ethernet Alliance, 1998). In general, as a network processor, the hardware-based multithreaded processor 220 may interface to any type of communication device or interface that receives or sends a large amount of data. Similarly, in an embodiment, the processor system 210 may function in a networking application to receive network packets and process those packets in a parallel manner.

Figure 3:
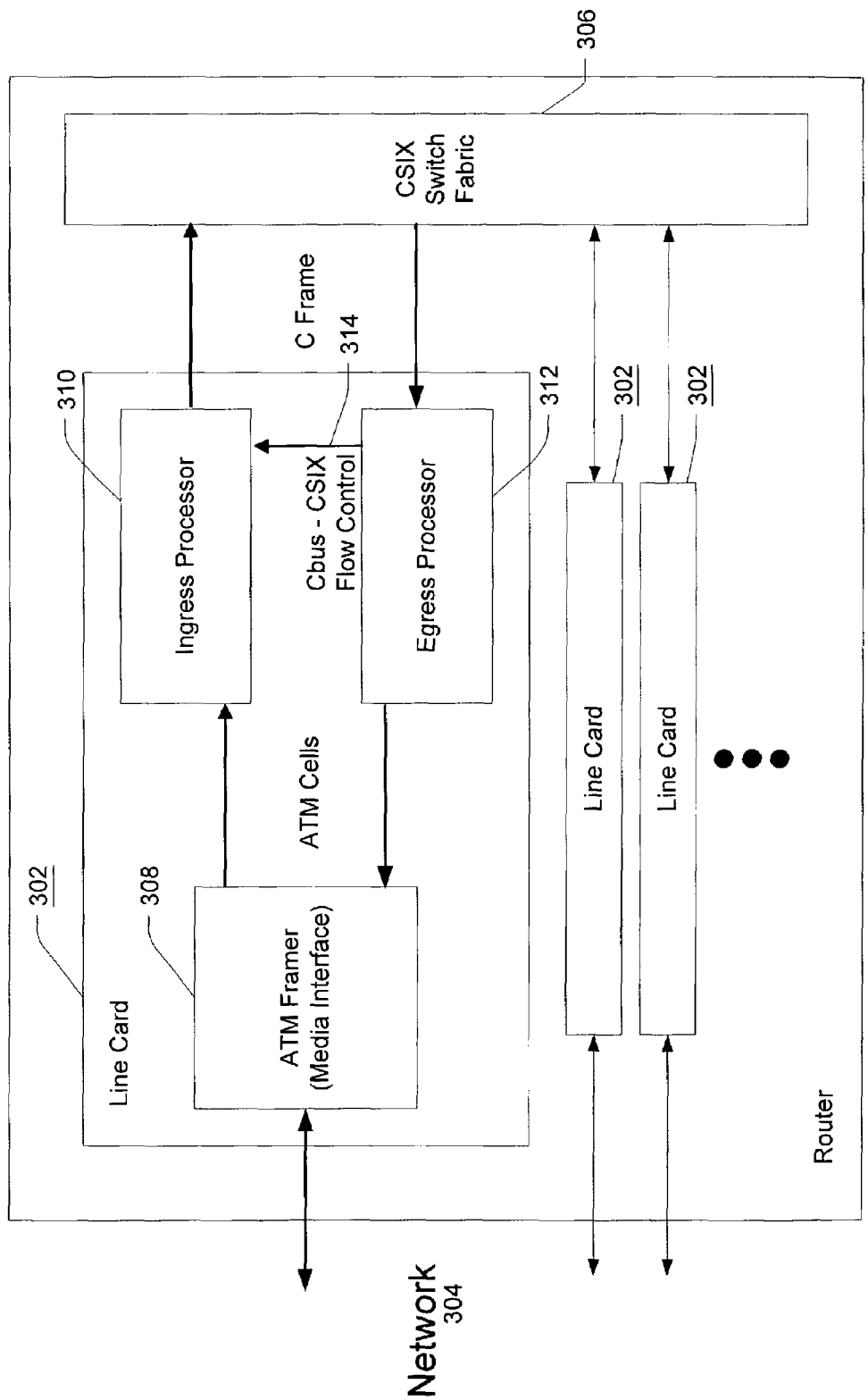
FIG. 3 provides an illustration of a network router according to an embodiment of the present invention.

FIG. 3 provides an illustration of a network router according to one embodiment of the present invention. In one embodiment, a line card 302 is used to process data on a network line. Each line card acts as an interface between a network 304 and a switching fabric 306. The line card 302 receives a data set from the network 304 via a framer (media interface) 308. In an embodiment, the framer 308 converts the data set from the format used by the network 304 to a format for processing, such as from Internet Protocol (IP; DARPA Internet Program Protocol Specification, September 1981) to Asynchronous Transfer Mode (ATM; Multiprotocol Over ATM, Version 1.0, July 1998). This conversion may include segmenting the data set (as described below). The converted (translated) data set is transmitted from the framer 308 to an ingress processor 310 (see 210 of FIG. 2). The ingress processor 310 performs necessary processing on the data set before forwarding it to the switching fabric 306. This processing may include further translation, encryption, error checking, and the like. After processing, the ingress processor 310 converts the data set into a transmission format for the switching fabric 306, such as the common switch interface (CSIX) protocol, then transmits the data set to the switching fabric 306.

In an embodiment, the line card 302 also provides transmission of a data set from the switching fabric 306 to the network 304. An egress processor 312 (see 210 of FIG. 2) receives a data set from the switching fabric 306, processes the data set, and transmits the data set to the framer 308 for protocol conversion in preparation for transmission over the network 304.

In one embodiment, a CSIX bus (CBUS) 314 carries flow control information from the egress processor 312 to the ingress processor 310. CSIX link level or fabric level flow control messages that originate in either the switch fabric 306 or the egress processor 312 are transmitted over the CBUS.

Figure 4:
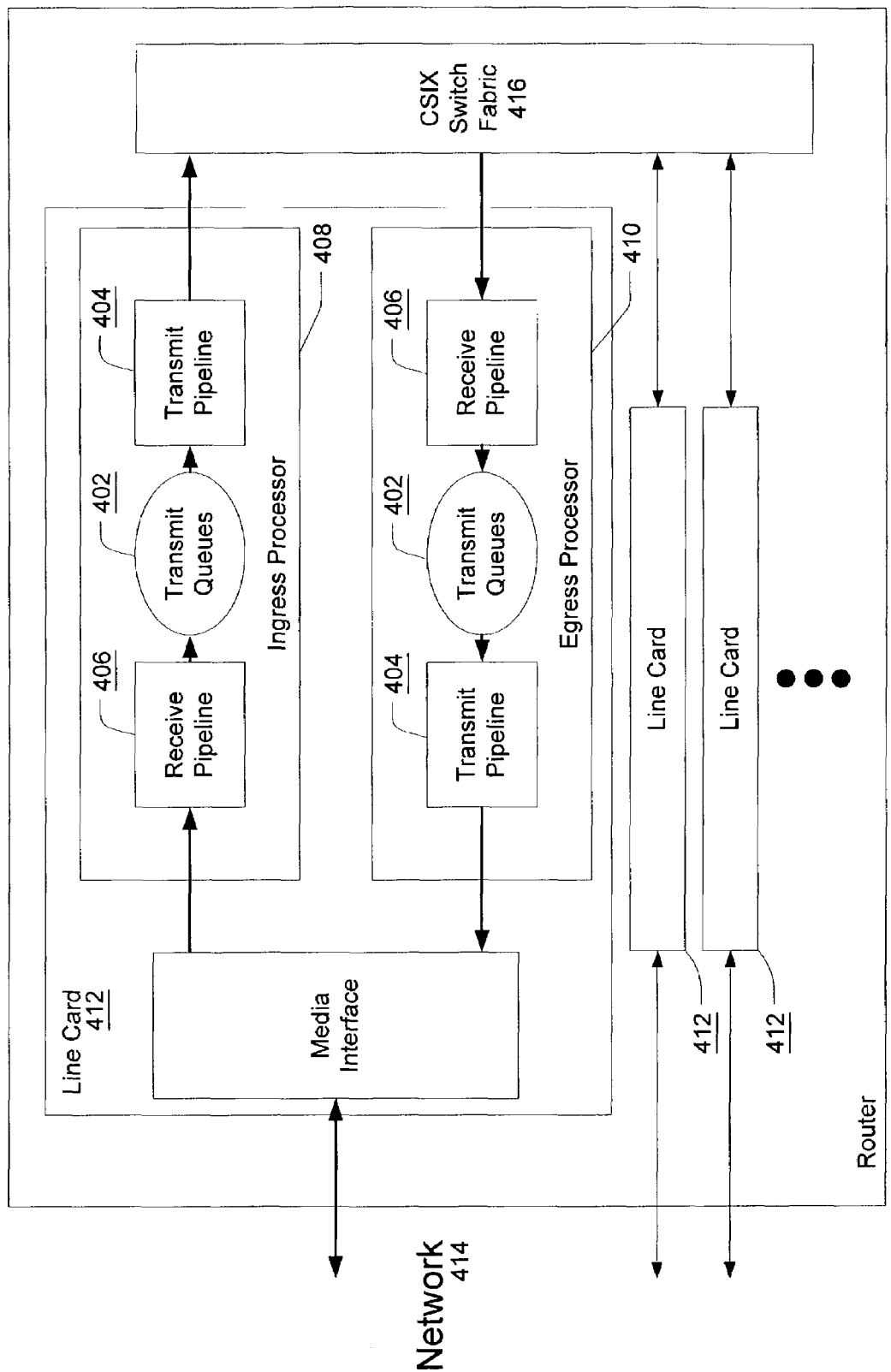
FIG. 4 provides a block diagram of the queuing scheme of a line card in a network router according to an embodiment of the present invention.

FIG. 4 provides a block diagram of the queuing scheme of a line card in a network router according to an embodiment of the present invention. In this embodiment, a data set is placed in a transmit queue 402 before proceeding from the receive pipeline 406 to the transmit pipeline 404 of the ingress 408 or egress 410 processor. The transmit queues 402 operate as buffers to accommodate changes in flow conditions for the processors. As stated above, in an embodiment, a line card 412 provides transmission of data between the switching fabric 416 and the network 414.

Figure 5:
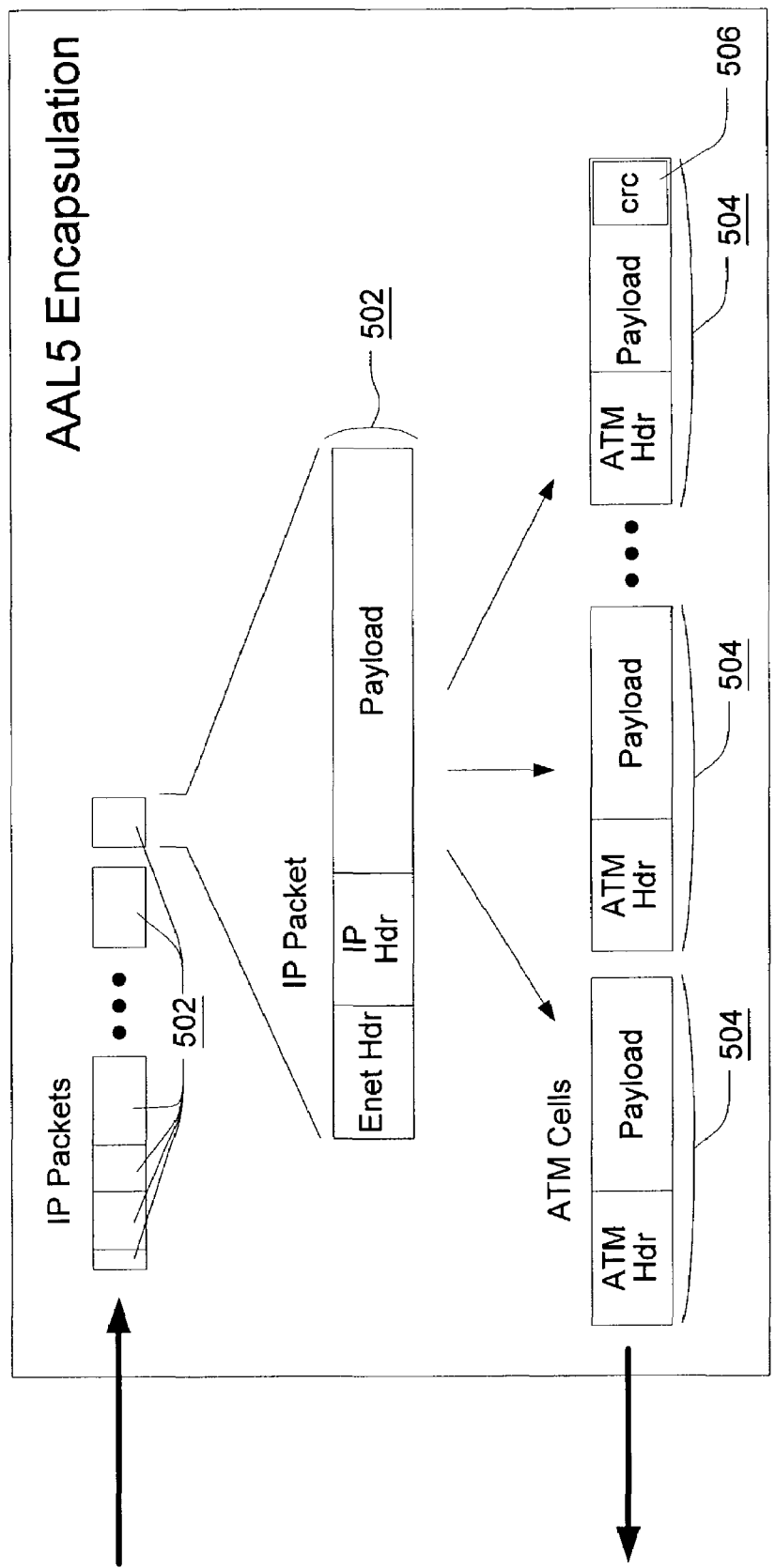
FIG. 5 illustrates the process of converting Internet Protocol (IP) packets to Asynchronous Transfer Mode (ATM) cells via ATM Adaptation Layer 5 (AAL5) encapsulation according to an embodiment of the present invention.

FIG. 5 illustrates the process of converting Internet Protocol (IP) packets to Asynchronous Transfer Mode (ATM) cells via ATM Adaptation Layer 5 (AAL5; ATM Forum, August 1996) encapsulation according to an embodiment of the present invention. Because of the variable size of the IP packets, each IP packet 502 is divided into one or more fixed-size packets under a protocol such as ATM. AAL5 encapsulation is a process of converting the information contained in an IP packet 502 to a series of one or more ATM cells 504. In an embodiment, an error checking system such as 32-bit Cyclic Redundancy Check (CRC32) is utilized to ensure accurate conversion and transmission. An error checking bit (term) 506 is added to one of the ATM cells 504 and utilized to verify error-free receipt of all ATM cells 504 representing a specific IP packet 502. This is possible because of the cumulative property of CRC.

For example, an IP packet, which is capable of being represented by several ATM cells, would have a CRC value computed for the first cell. The remainder of this computation is called the residual. The residual is then inputted into the CRC computation for the second cell, and so on. At the end, just one CRC value is effective for the entire series of ATM cells, which represent the IP packet.

Figure 6:
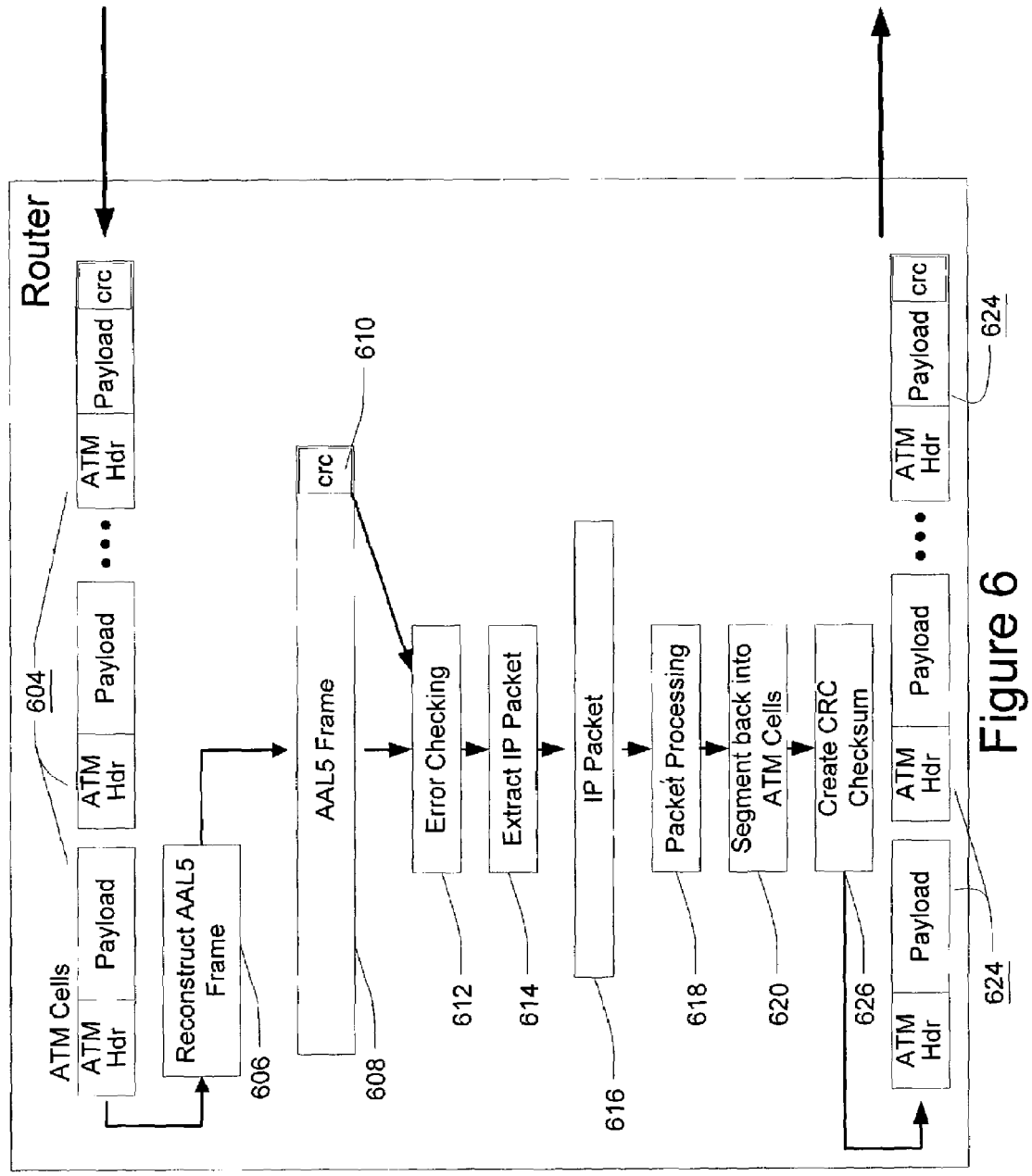
FIG. 6 provides a flow chart illustrating the process of error detection through the network router according to an embodiment of the present invention.

FIG. 6 provides a flow chart illustrating the process of error detection through the network router according to an embodiment of the present invention. In this embodiment, after being converted to the ATM protocol (not shown), the ATM cells 604 are reconstructed 606 into AAL5 frames 608, each representing an IP frame and having an error-checking (correction) term (CRC-32) 610. In one embodiment, on the receive side, the error correction term is utilized to determine 612 whether the data set was received free of errors. Once it is determined that the entire frame has been re-assembled without error, the IP frame (packet) 616 is extracted 614 for IP packet processing, such as for routing, classification, metering, policing, congestion management, etc. 618. On the transmit side, before the frame is transmitted over the ATM interface (not shown), in an embodiment, the IP frame is converted 620 back into a set of ATM cells 624 via the AAL5 protocol, and the error correction term (the CRC-32 value) is produced 626 for the series.

Figure 7:
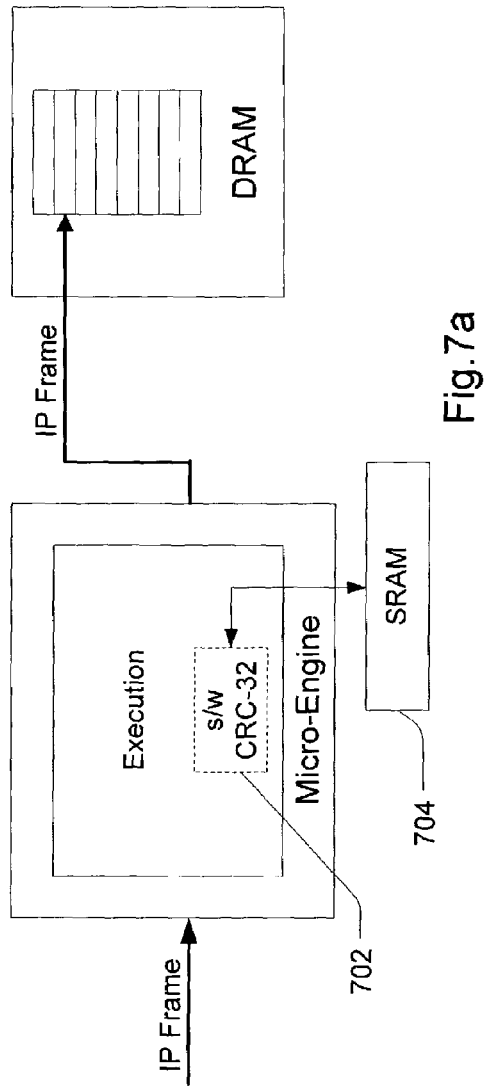
FIG. 7 illustrates two possible systems of error checking for a network processor micro-engine.
Figure 7:
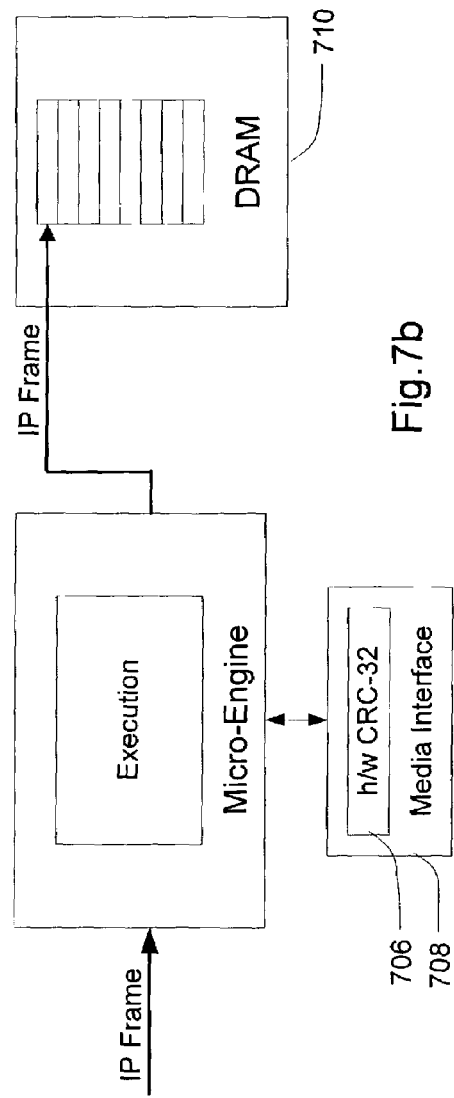

FIG. 7 illustrates two possible systems of error correction for a network processor micro-engine and their respective drawbacks. As stated above, to realize high line rates such as Optical Carrier 48 (OC48,=2.49 Gigabits Per Second), network bottlenecks need to be eliminated. Error correction operations must be performed at speeds compatible with OC48, while not requiring additional micro-engines (processing engines). FIG. 7a describes utilizing a software-based error correction system 702. In using such a system, code is read from a memory source such as SRAM 704. This process may require execution of up to twenty instructions for the error correction of every four bytes, which may be too slow for achieving the requirements of the OC48 standard.

FIG. 7b describes utilizing a hardware-based error correction system 706, which is located in the media interface 708. A potential problem with this configuration is the complexity of the correction system and time-lag added due to the fact that the IP frame location in DRAM 710 is not readily known by the media interface 708. In this example, the micro-engine is being utilized to place the IP frame in memory 710 at an appropriate location. In order for the error correction system to operate on the media interface 708, the media interface 708 must be reconfigured to do the error correction, which adds complexity. Further, the media interface 708 must be able to figure out which location in DRAM the IP frame is put to keep coordinated with the correct data set. All of this adds complexity to the design and detrimentally affects the performance (line rate) of the system.

Figure 8:
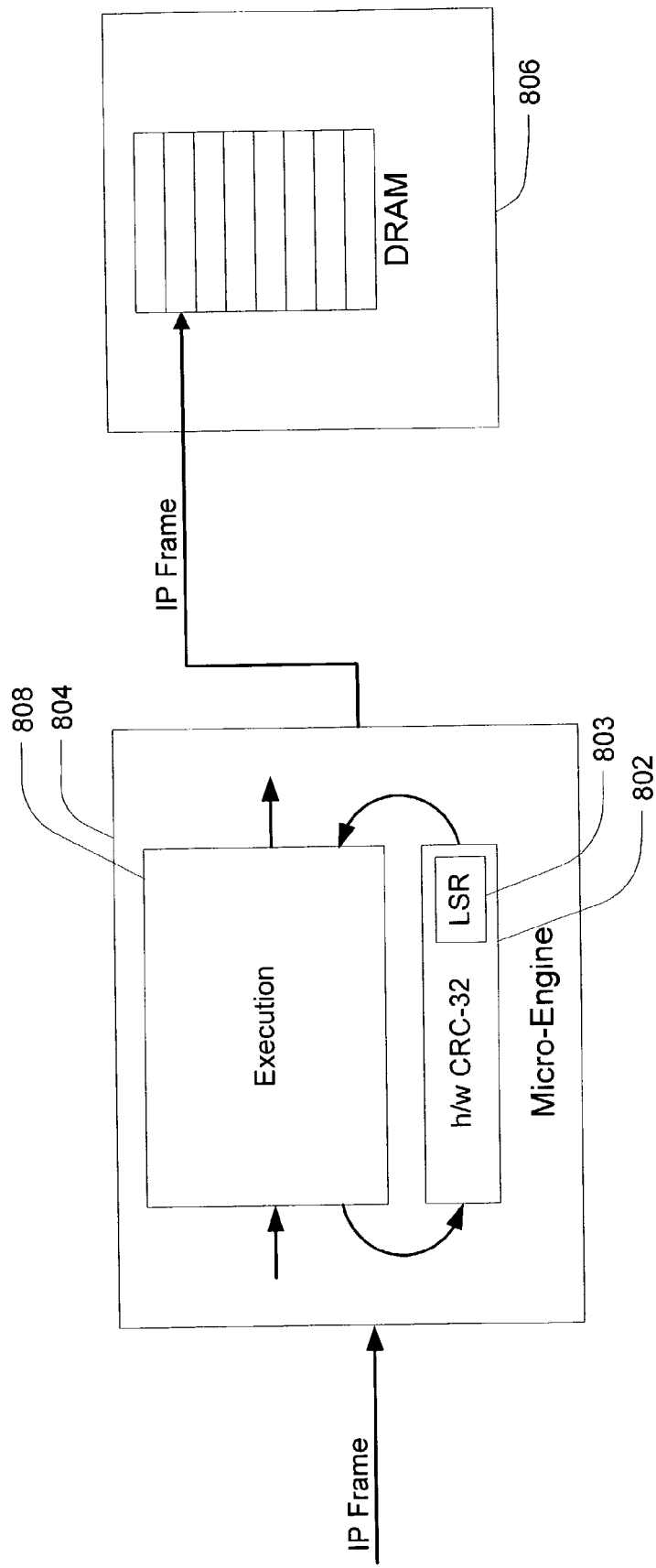
FIG. 8 illustrates a system of error checking for a network processor micro-engine according to an embodiment of the present invention.

FIG. 8 illustrates a system of error correction for a network processor micro-engine according to an embodiment of the present invention. In this embodiment, a hardware-based error-correction system 802 in the micro-engine 804 is utilized. Because the location in memory 806 for the IP frame is known within the micro-engine 804, the error-correction system 802 can be relatively simple and efficient. Further, having error-correction performed by a hardware-based system 802 may increase throughput (line rate) greatly. In one embodiment, an error-detecting polynomial algorithm, such as is known in the art, can be performed by a hardware block such as a linear shift register (LSR) 803 for the computation of a checksum term (such as by CRC-32). This can be performed while (in parallel with) the micro-engine processes (execution) 808 the data set for other functions such as determining which location in memory 806 the frame should be placed for buffering.

In one embodiment, the CRC-32 residue for each segment (ATM cell) of the AAL5 frame is stored in the re-assembly context for that particular virtual circuit (VC). The CRC-32 unit takes two operands. One of the operands is from a CRC remainder register, containing the partial remainder for the CRC. The other operand is the new data payload. The CRC unit 802 computes the CRC operation using an algorithm, such as CRC-32 or CRC-CCITT (Consultative Committee for International Telephone & Telegraph), and writes the result back into the CRC remainder register.

Although several embodiments are specifically illustrated and described herein, it will be appreciated that modifications and variations of the present invention are covered by the above teachings and within the purview of the appended claims without departing from the spirit and intended scope of the invention.

The invention claimed is:

1. A system for network data transfer comprising:
   an intermediate device to pass a data set from a first device to at least one of a plurality of locations in a memory device, said intermediate device having an execution unit and an error correction device, wherein
   said first device is a media interface to translate said data set from a first protocol to a second protocol;
   said execution unit is to determine where in said memory device to pass said data set; and
   said error correction device is a hardware device to operate in parallel with said execution unit.

2. The system of claim 1, wherein said memory device is Dynamic Random Access Memory (DRAM).

3. The system of claim 1, wherein said intermediate device is a processing engine.

4. The system of claim 1, wherein said first protocol is Internet Protocol (IP) and includes an error check term for said data set.

5. The system of claim 4, wherein said second protocol is an encapsulation of said Internet Protocol (IP) with said error check term and said error correction device utilizes an error-detecting polynomial.

6. The system of claim 5, wherein said second protocol is ATM (Asynchronous Transfer Mode) Adaptation Layer 5 (AAL5).

7. The system of claim 5, wherein said error correction device utilizes an error-detecting polynomial.

8. The system of claim 7, wherein said error correction device processes said data set to yield a value, said value to be compared to said error check term for error detection.

9. The system of claim 8, wherein said error-detecting polynomial is hardware-driven 32-bit Cyclic Redundancy Code (CRC-32).

10. The system of claim 8, wherein said error correction device includes a linear shift register.

11. A method for network data transfer comprising:
    transferring a data set, by an intermediate device, from a first device to at least one of a plurality of locations in a memory device wherein said first device is a media interface to translate said data set from a first protocol to a second protocol, said intermediate device having an execution unit and an error correction device;
    determining, by said execution unit, where in said memory device to transfer said data set; and
    processing said data set, by said error correction device, in parallel with said execution unit.

12. The method of claim 11, wherein said memory device is Dynamic Random Access Memory (DRAM).

13. The method of claim 11, wherein said intermediate device is a processing engine.

14. The method of claim 11 wherein said first protocol is Internet Protocol (IP) and includes an error check term for said data set.

15. The method of claim 14, wherein said second protocol is an encapsulation of said Internet Protocol (IP) with said error check term and said error correction device utilizes an error-detecting polynomial.

16. The method of claim 15, wherein said second protocol is ATM (Asynchronous Transfer Mode) Adaptation Layer 5 (AAL5).

17. The method of claim 15, wherein said error correction device utilizes an error-detecting polynomial.

18. The method of claim 17, wherein said error correction device processes said data set to yield a value, said value to be compared to said error check term for error detection.

19. The method of claim 18, wherein said error-detecting polynomial is hardware-driven 32 bit Cyclic Redundancy Code (CRC-32).

20. The method of claim 18, wherein said error correction device includes a linear shift register.

21. An apparatus for network data transfer comprising:
a processing engine to forward a data set, having an error check term, from a media interface to at least one location in a memory device, said media interface to translate said data set from a first protocol to a second protocol and said processing engine including an execution unit to determine where in said memory device to forward said data set; and
an error-correction device including a linear shift register to compare said error check term to a value computed by said linear shift register.

22. The system of claim 21, wherein said memory device is Dynamic Random Access Memory (DRAM).

23. The system of claim 22, wherein said media interface is an Asynchronous Transfer Mode (ATM) Framer.

24. The system of claim 23, wherein said first protocol is Internet Protocol (IP) and said second protocol is ATM (Asynchronous Transfer Mode) Adaptation Layer 5 (AAL5).

25. The system of claim 24, wherein said error-correction device utilizes 32-bit Cyclic Redundancy Code (CRC-32).

26. A system for network data transfer comprising:
a line card including a processing engine, said processing engine to forward a data set having an error check term from a media interface to at least one location in a memory device; and
an error-correction device including a linear shift register to compare said error check term to a value computed by said linear shift register, wherein
said media interface is to translate said data set from a first protocol to a second protocol and is coupled to a network; and
said processing engine includes an execution unit to determine where in said memory device to forward said data set.

27. The system of claim 26, wherein said memory device is Dynamic Random Access Memory (DRAM) and said media interface is an Asynchronous Transfer Mode (ATM) Framer.

28. The system of claim 27, wherein said first protocol is Internet Protocol (IP) and said second protocol is ATM (Asynchronous Transfer Mode) Adaptation Layer 5 (AAL5).

* * * * *

UNITED STATES PATENT AND TRADEMARK OFFICE
CERTIFICATE OF CORRECTION

PATENT NO.         : 7,103,821 B2                                              Page 1 of 1
APPLICATION NO.    : 10/188516
DATED              : September 5, 2006
INVENTOR(S)        : Lakshmanamurthy et al.

It is certified that error appears in the above-identified patent and that said Letters Patent is hereby corrected as shown below:

In column 6, line 65, in Claim 14, after "claim 11" insert -- , --.

In column 7, line 14, in Claim 19, delete "32 bit" and insert -- 32-bit --, therefor.

Signed and Sealed this

Nineteenth Day of December, 2006

JON W. DUDAS
*Director of the United States Patent and Trademark Office*